(12) United States Patent
Jang

(10) Patent No.: US 10,658,870 B2
(45) Date of Patent: May 19, 2020

(54) COMBO ANTENNA UNIT AND WIRELESS POWER RECEIVING MODULE COMPRISING SAME

(71) Applicant: Amosense Co., Ltd., Cheonan-si (KR)

(72) Inventor: Kil Jae Jang, Seongnam-si (KR)

(73) Assignee: Amosense Co., Ltd., Cheonan-si (KR)

( * ) Notice: Subject to any disclaimer, the term of this patent is extended or adjusted under 35 U.S.C. 154(b) by 209 days.

(21) Appl. No.: 15/574,161

(22) PCT Filed: May 18, 2016

(86) PCT No.: PCT/KR2016/005252
§ 371 (c)(1),
(2) Date: Nov. 15, 2017

(87) PCT Pub. No.: WO2016/186443
PCT Pub. Date: Nov. 24, 2016

(65) Prior Publication Data
US 2018/0138746 A1    May 17, 2018

(30) Foreign Application Priority Data
May 18, 2015    (KR) .......................... 10-2015-0068902

(51) Int. Cl.
*H02J 50/10* (2016.01)
*H01Q 7/00* (2006.01)
(Continued)

(52) U.S. Cl.
CPC ............... *H02J 50/10* (2016.02); *H01F 3/10* (2013.01); *H01F 27/365* (2013.01); *H01F 38/14* (2013.01);
(Continued)

(58) Field of Classification Search
None
See application file for complete search history.

(56) References Cited

U.S. PATENT DOCUMENTS

| 9,515,513 B2* | 12/2016 | Suzuki | ..................... H02J 7/025 |
| 2013/0099998 A1* | 4/2013 | Lin | .......................... H01Q 1/38 |
| | | | 343/893 |

(Continued)

FOREIGN PATENT DOCUMENTS

| CN | 2015-60631 Y | * | 3/2015 |
| CN | 2018-51761 C | * | 7/2018 |

(Continued)

*Primary Examiner* — Lincoln D Donovan
*Assistant Examiner* — Khareem E Almo
(74) *Attorney, Agent, or Firm* — Daly Crowley Mofford & Durkee, LLP (57) ABSTRACT

Provided are a combo antenna unit, and a wireless power receiving module including the same. The combo antenna unit includes a wireless power transmission antenna and at least one additional antenna using a different frequency band from the wireless power transmission antenna. The wireless power transmission antenna includes a radiator formed of a loop-shape-wound flat coil. According to the present invention, it is possible to reduce resistance so as to decrease heat generation and increase charging efficiency, and minimize the amount of circuit board used, thereby reducing overall production costs.

14 Claims, 9 Drawing Sheets

(51) Int. Cl.
   *H01Q 1/52*   (2006.01)
   *H01F 3/10*   (2006.01)
   *H01Q 1/38*   (2006.01)
   *H01F 27/36*   (2006.01)
   *H01F 38/14*   (2006.01)
   *H01Q 1/22*   (2006.01)
   *H01Q 1/24*   (2006.01)
   *H02J 50/12*   (2016.01)
   *H02J 7/02*   (2016.01)

(52) U.S. Cl.
   CPC .............. *H01Q 1/2225* (2013.01); *H01Q 1/24* (2013.01); *H01Q 1/38* (2013.01); *H01Q 1/526* (2013.01); *H01Q 7/00* (2013.01); *H01F 2003/106* (2013.01); *H02J 7/025* (2013.01); *H02J 50/12* (2016.02)

(56) References Cited

U.S. PATENT DOCUMENTS

| | | | | |
|---|---|---|---|---|
| 2014/0091758 | A1* | 4/2014 | Hidaka | H04B 5/0093 320/108 |
| 2014/0145807 | A1* | 5/2014 | Choi | H01F 27/365 335/302 |
| 2014/0306656 | A1* | 10/2014 | Tabata | H01F 38/14 320/108 |
| 2314/0333253 | | 11/2014 | Suzuki et al. | |
| 2014/0375262 | A1* | 12/2014 | Yamaguchi | H02J 50/90 320/108 |
| 2017/0040694 | A1* | 2/2017 | Singh | H01F 27/38 |
| 2017/0237152 | A1* | 8/2017 | Lee | H01Q 1/243 343/702 |
| 2018/0040950 | A1* | 2/2018 | Lee | H01Q 1/526 |
| 2018/0069294 | A1* | 3/2018 | Kang | H01Q 1/2291 |
| 2018/0069299 | A1* | 3/2018 | Kang | H01Q 7/00 |
| 2018/0069301 | A1* | 3/2018 | Choi | H01Q 1/243 |
| 2018/0198209 | A1* | 7/2018 | Kang | H01Q 7/06 |
| 2018/0248255 | A1* | 8/2018 | Noh | H01Q 1/38 |
| 2018/0277954 | A1* | 9/2018 | Lee | H01Q 7/00 |
| 2018/0366812 | A1* | 12/2018 | Kim | H01Q 1/44 |
| 2019/0013568 | A1* | 1/2019 | Won | H01Q 1/2208 |
| 2019/0027302 | A1* | 1/2019 | Noh | H02J 50/70 |
| 2019/0044391 | A1* | 2/2019 | Jang | H01F 38/14 |
| 2019/0074577 | A1* | 3/2019 | Kim | H04B 5/0025 |
| 2019/0082564 | A1* | 3/2019 | Jang | H01Q 7/00 |
| 2019/0165452 | A1* | 5/2019 | Jeon | H01Q 1/243 |
| 2019/0165470 | A1* | 5/2019 | Jeon | H01Q 1/243 |

FOREIGN PATENT DOCUMENTS

| | | | |
|---|---|---|---|
| JP | 2013-182481 A | | 9/2013 |
| KR | 10-2013-0015244 A | | 2/2013 |
| KR | 20130015244 A | * | 2/2013 |
| KR | 10-2013-0021791 A | | 3/2013 |
| KR | 10-2013-0101245 A | | 9/2013 |
| KR | 2016-428732 | * | 9/2018 |
| KR | 101926615 B1 | * | 12/2018 |
| KR | 2017-30151 Y | * | 3/2019 |
| TW | 2009-B07259 | * | 3/2009 |
| TW | 2011-E86907 | * | 5/2010 |

* cited by examiner

COMBO ANTENNA UNIT AND WIRELESS POWER RECEIVING MODULE COMPRISING SAME

CROSS-REFERENCE TO RELATED APPLICATION

This application is a U.S. National Stage of PCT/KR2016/005252 filed in the Korean language on May 18, 2016, entitled: "Combo Antenna Unit And Wireless Power Receiving Module Comprising Same" which application claims priority to Korean Application No. 10-2015-0068902 filed on May 18, 2015, which applications are each hereby incorporated herein by reference in their entireties.

BACKGROUND OF THE DISCLOSURE

Field of the Disclosure

The present invention relates to a combo antenna unit and a wireless power receiving module including the same.

Description of the Related Art

Recently, various functions including radio frequency identification (RFID), near field communication (NFC), a wireless charger, an interactive pen tablet and the like are added to portable terminals including mobile phones and tablet Personal Computers.

NFC is one of RFID, which is an electronic tag, and refers to a technology for transferring data between terminal devices within a short range of 10 cm by using a non-contact short-range wireless communication module using a frequency band of 13.56 MHz. NFC is extensively used for mobile payment as well as a file transfer method of transferring goods information at a supermarket or a general store, or travel information for visitors, traffic information, access control and locking devices, and the like.

In addition, according to the latest Google's announcement, the "Android Beam" equipped with smartphones provides the ability to transfer photos, business cards, files, maps, web sites, etc., as well as mobile payment, as NFC-based local area information transmission and reception functions, from one phone to another phone.

Meanwhile, a portable terminal has a wireless charging function for wirelessly charging a built-in battery. The wireless charging function is performed by a wireless power receiving module built in the portable terminal, and a wireless power transmitting module for supplying power to the wireless power receiving module. In recent years, the thickness of the wireless power receiving module built in the portable terminal has been reduced as the size of the portable terminal has been reduced. For example, the total thickness of the wireless power receiving module is designed to be equal to or less 0.6 m, or even equal to or less 0.3 mm.

When the thickness of the wireless power receiving module is designed to be equal to or less 0.6 mm, or even equal to or less 0.3 mm, it is difficult to realize the characteristics required for the wireless charging function. Accordingly, in order to satisfy the required characteristics at the limited thickness, it is necessary to reduce the overall thickness of a shielding unit, or to reduce the thickness of a radiator constituting the antenna.

However, if the thickness of the shielding unit is reduced, there is a problem that the charging efficiency is deteriorated due to reduction of the shielding performance of a magnetic field. If the thickness of the radiator constituting the antenna, especially the radiator constituting the wireless power transmission antenna, is reduced, a resistance is increased by reduction of cross-sectional area of the radiator. Thus, the charging efficiency is deteriorated, and heat is generated.

In general, a plurality of radiators is formed on a surface of a circuit board as a pattern to constitute the antennas. However, using the circuit board causes increase of cost of the final product because the production cost of the circuit board is relatively higher than that of other components.

SUMMARY OF THE DISCLOSURE

To solve the above problems and defects, it is an object of the present invention to provide a combo antenna unit including a plurality of antennas performing different roles, and a wireless power receiving module including the combo antenna unit. At least one of the antennas including a wireless power transmission antenna is formed of a flat coil. Thus, the combo antenna unit can increase the charging efficiency by lowering the heat generation according to reduction of resistance.

It is another object of the present invention to provide a combo antenna unit including a plurality of antennas performing different roles, and a wireless power receiving module including the combo antenna unit. The plurality of antennas is combined in the form of a flat coil and a pattern printed on a surface of a circuit board. Thus, the total cost of production can be reduced by minimizing usage of a circuit board.

It is still another object of the present invention to provide a combo antenna unit and a wireless power receiving module including the combo antenna unit. In the combo antenna unit, antennas operating in different frequency bands are separately arranged in different regions, and a shielding sheet having different characteristics is disposed in a region corresponding to each antenna. Thus, a shielding performance of a magnetic field according to a frequency band can be optimized.

To accomplish the above and other objects of the present invention, according to an aspect of the present invention, there is provided a combo antenna unit including a wireless power transmission antenna and at least one additional antenna using a different frequency band from the wireless power transmission antenna, wherein the wireless power transmission antenna includes a radiator formed of a loop-shape-wound flat coil.

Also, the additional antenna may include one or both of a magnetic secure transmission (MST) antenna and an NFC antenna.

In addition, the MST antenna or the NFC antenna may include a radiator formed of a loop-shape-wound flat coil, and a surface of the radiator may be attached to a shielding unit.

Alternatively, the additional antenna may include an MST antenna and an NFC antenna, and each of the MST antenna and the NFC antenna may include a radiator formed of a printed pattern on a circuit board which is attached to a surface of the shielding unit.

In addition, the additional antenna includes an MST antenna and an NFC antenna, wherein the MST antenna may include a radiator formed of a loop-shaped-wound flat coil, and wherein the NFC antenna may include a radiator formed of a printed pattern on a circuit board which is attached to a surface of a shielding unit.

Also, the circuit board may include a through-hole with a predetermined area formed in a region corresponding to the flat coil, and the flat coil may be disposed in the through-hole and directly attached to a surface of the shielding unit.

In addition, the flat coil and the circuit board may be disposed in parallel on the same plane.

Meanwhile, the present invention provides a wireless power receiving module including a combo antenna unit and a shield unit. The combo antenna unit includes a wireless power transmission antenna and at least one additional antenna using a different frequency band than the wireless power transmission antenna. The shielding unit is disposed on a surface of the combo antenna unit and shields a magnetic field to condense the magnetic field in a desired direction. The wireless power transmission antenna includes a radiator formed of a loop-shape-wound flat coil.

Further, the shielding unit may include a first region and a second region divided by a virtual straight line as boundary. The flat coil is attached to the first region, and the circuit board is attached to the second region In addition, the flat coil may include a pair of connection terminals at both ends for electrical connection, and a receiving portion, in which a lead portion including the connection terminals is disposed, on a surface of the shielding unit.

Further, the receiving portion may be a receiving recess, which is dented by a predetermined depth from a surface of the shielding unit, and the lead portion may be inserted in the receiving recess.

Further, the receiving portion may be an incision portion, which is incision-formed on an inner side of the shielding unit, and the lead portion may be inserted in the incision portion.

Further, the shielding unit may include a first sheet for improving performance of the wireless power transmission antenna and a second sheet for improving performance of the NFC antenna, wherein the first sheet is disposed in the first region and the second sheet may be disposed in the second region.

In addition, the first sheet and the second sheet may be arranged such that ends of the first sheet and the second sheet abut against each other on the same plane.

Further, the first sheet may be a ribbon sheet including at least one of an amorphous alloy and a nanocrystalline alloy, and the second sheet may be a ferrite sheet.

According to the present invention, at least some of the antennas including the wireless power transmission antenna are formed of a flat coil, so that the heat generation is reduced and the charging efficiency is increased due to reducing the resistance.

Further, in constructing the antenna unit to include a plurality of antennas for different roles, the plurality of antenna are combined in the form of a flat coil and a pattern printed on a surface of the circuit board, thereby minimizing quantity of the circuit board to be used and thus the overall production cost.

Further, when the antennas operating in different frequency bands are separately disposed in different regions, the shielding unit includes at least two sheets having different characteristics, and the two sheets are arranged in parallel on the same plane. Thus, the overall thickness of the antenna can be reduced and thereby achieving thinness while satisfying the charging characteristics required by the wireless charging method.

BRIEF DESCRIPTION OF THE DRAWINGS

FIGS. 3A and 3B are views showing various embodiments of a combo antenna applied to FIG. 1, wherein FIG. 3A shows a case where all antennas are formed of a flat coil, and FIG. 3B shows a case where a wireless power transmission antenna and an MST antenna are formed of a flat coil.

FIGS. 7A and 7B are views showing a case where a plurality of antennas are separately arranged in a first region and a second region, respectively, wherein FIG. 7A shows a case where all of the plurality of antennas are formed of a flat coil, and FIG. 7B shows a case where a wireless power transmission antenna and an MST antenna are formed of a flat coil.

DETAILED DESCRIPTION OF THE DISCLOSURE

The above and other objects, features, and advantages of the present invention can be appreciated by the following description and will be understood more clearly by embodiment of the present invention. In addition, it will be appreciated that the objects and advantages of the present invention will be easily realized by means shown in the appended patent claims, and combinations thereof. Accordingly, the technical spirit of the present invention can be easily implemented by one of ordinary skill in the art. Further, if it is determined that the detailed description of the known art related to the present invention makes the gist of the present invention unnecessarily obscure, a detailed description thereof will be omitted.

Each of wireless power receiving modules 100 and 200 according to exemplary embodiments of the present invention may include a combo antenna unit 110, 110' or 110", and a shielding unit 120 or 120' as shown in FIGS. 1 to 5.

The combo antenna units 110, 110' and 110" are configured to receive wireless signals from portable electronic devices such as cellular phones, PDAs, PMPs, tablets, multimedia devices and the like.

Each of the combo antenna units 110, 110' and 110" may include a plurality of antennas 114, 115 and 116 that perform different roles, and may be fixed to a surface of the shielding unit 120 through an adhesive layer 124.

Each of the combo antenna units 110, 110' and 110" may include a part serving as a receiving coil (Rx coil) (secondary coil) configured to receive the wireless power signal transmitted from a transmitting apparatus thereby producing a power required by the portable electronic device, and other parts described below. In other words, each of the combo antenna units 110, 110' and 110" may include a wireless power transmission antenna 116 for wireless charging, and further include at least one of an MST antenna 115 and an NFC antenna 114, each of which may use a frequency band different from that of the wireless power transmission antenna 116.

Here, the wireless power transmission antenna 116, the MST antenna 115, and the NFC antenna 114 may be electrically connected to terminals 117, which are formed on a circuit board 112 or 212, through direct connection or through a via-hole.

A radiator of at least the wireless power transmission antenna 116 among the plurality of antennas 114, 115, and 116 may be formed of a flat coil wound in a clockwise direction or counterclockwise direction. The flat coil may have a circular shape, an elliptical shape, a spiral shape, or a polygonal shape such as a quadrangular shape. A surface of the radiator may be fixed to the shielding unit 120 via an adhesive layer 124.

Unlike a conventional technology using a wireless power transmission antenna formed of a printed pattern on a surface of a circuit board, in the present invention, the wireless power transmission antenna 116 is provided as a flat coil, and directly fixed to a surface of the shielding unit 120. Thus, the overall thickness of the radiator of the wireless power transmission antenna 116 can be increased as much as the thickness of a substrate layer of the circuit board.

Accordingly, without increasing the overall thickness of the wireless power receiving modules 100 and 200, a cross-sectional area of the radiator constituting the wireless power transmission antenna 116 may be increased, so that the resistance of the radiator can be reduced. Therefore, a heat generated in the wireless power transmission antenna 116 during wireless charging can be reduced. Furthermore, increased power by the reduced resistance may shorten the charging time, and the overall charging efficiency can be enhanced.

Here, the wireless power transmission antenna 116 may include a pair of connection terminals 116a and 116b at both ends for electrical connection with the circuit board. The wireless power transmission antenna 116 may include lead portions 116c and 116d extending from both ends of the flat coil by a predetermined length, and ends of the lead portions 116c and 116d may respectively include the pair of the connection terminals 116a and 116b. As the pair of lead portions 116c and 116d are disposed at receiving portions 126a and 126b of the shielding units 120 and 120' to be described below, the pair of the connection terminals 116a and 116b can be electrically connected to the circuit board through the receiving portions 126a and 126b, regardless of position of the wireless power transmission antenna 116.

In an exemplary example, the MST antenna 115 and the NFC antenna 114, like the wireless power transmission antenna 116, may include a radiator formed of a flat coil having a circular shape, an elliptical shape, a spiral shape, or a polygonal shape such as a quadrangular shape, in which the coil may be wound in a clockwise direction or in a counterclockwise direction. The radiator may be directly fixed to a surface of the shielding unit 120. In another exemplary embodiment, the radiator of each of the MST antenna 115 and the NFC antenna 114 may be formed of a printed pattern on at least a surface of the circuit board 112, and attached to a surface of the shielding unit 120 via the circuit board 112.

Figure 1:
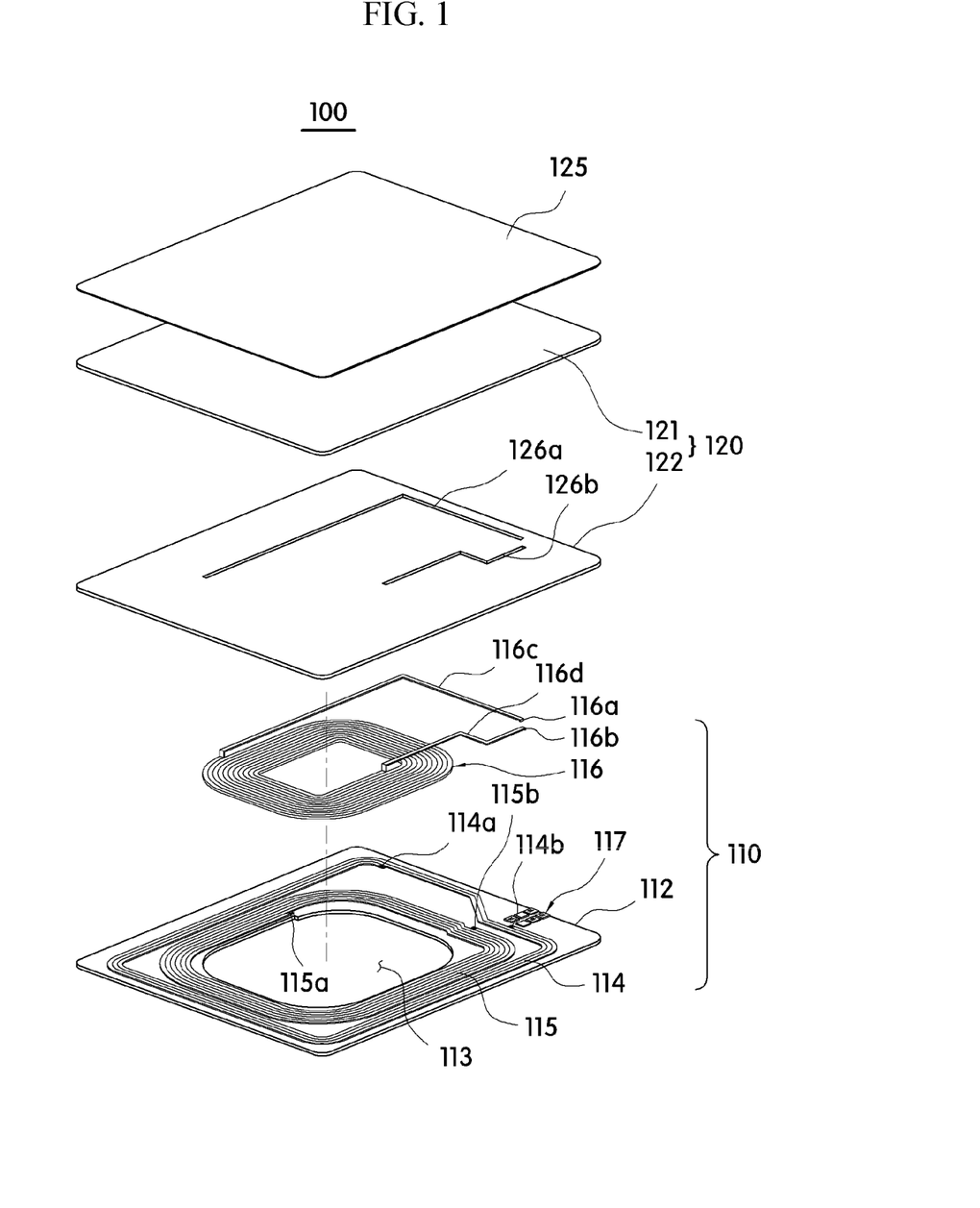
FIG. 1 is a block diagram of a wireless power receiving module according to an embodiment of the present invention.
Figure 2:
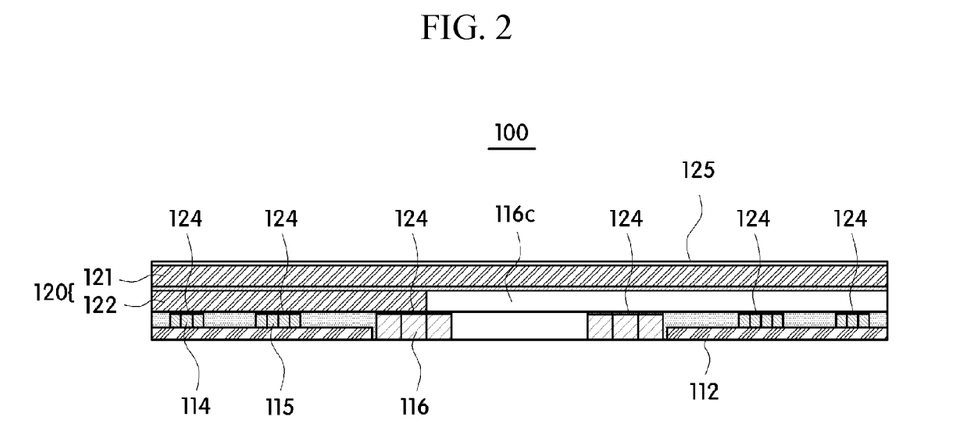
FIG. 2 is a cross-sectional view of FIG. 1.

Accordingly, as shown in FIGS. 1 and 2, in the combo antenna unit 110, the radiator of the wireless power transmission antenna 116 may be formed of a flat coil, and the radiators of the MST antenna 115 and the NFC antenna 114 may be formed of a conductive pattern printed on a surface of the circuit board 112. In this case, the MST antenna 115 and the NFC antenna 114 may be arranged outside the wireless power transmission antenna 116.

In an exemplary embodiment, a through-hole 113 having an area corresponding to the wireless power transmission antenna 116 may be provided in the central portion of the circuit board 112, so that the wireless power transmission antenna 116 of which radiator is formed of a flat coil may be arranged therein. The wireless power transmission antenna 116 with the radiator formed of a flat coil may be disposed in the through-hole 113, and may be electrically connected to the terminals 117 of the circuit board 112, through the lead portions 116c and 116d and the connection terminals 116a and 116b. The MST antenna 115 and the NFC antenna 114 disposed outside the wireless power transmission antenna 116 may include radiators formed of patterns on a surface of the circuit board 112 or 212 so as to surround the wireless power transmission antenna 116 disposed in the through-hole 113. Connection terminals 114a, 114b, 115a and 115b provided at both ends of the antennas may be connected to the terminals 117 located on a side of the circuit board 112 through the via-hole.

Figure 3A:
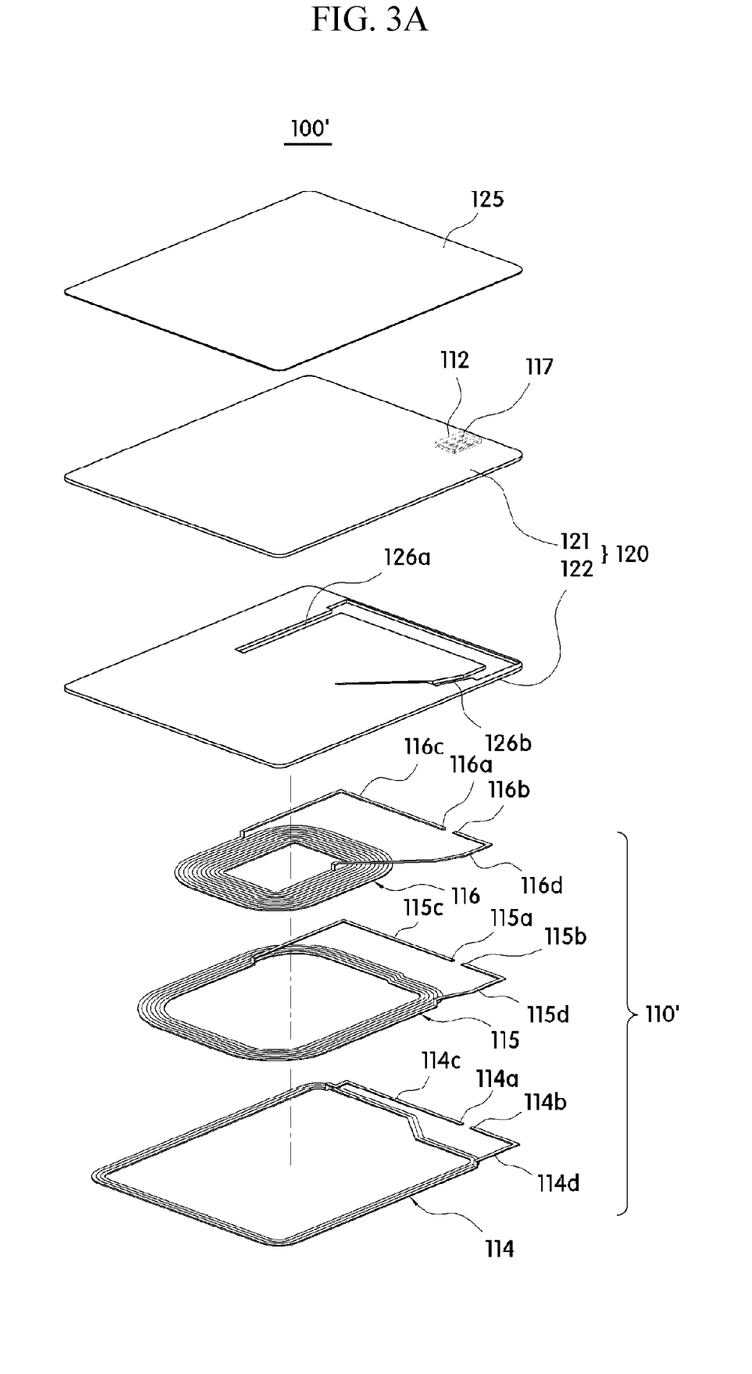
Figure 3B:
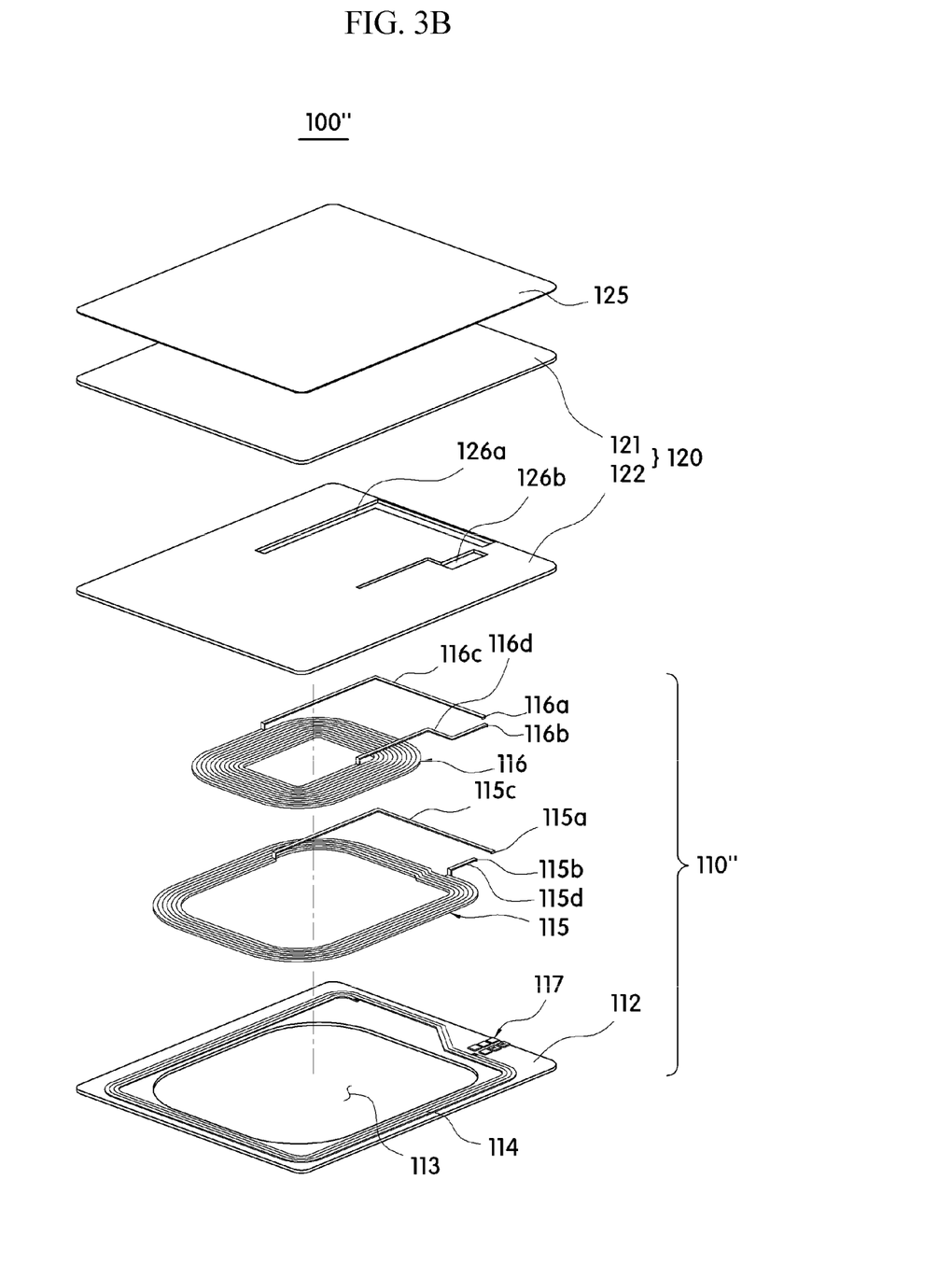

In an exemplary embodiment, as shown in FIG. 3B, the combo antenna unit 110" may include a wireless power transmission antenna 116 and an MST antenna 115 of which radiators are formed of flat coils, and an NFC antenna of which radiator is formed of a pattern on a surface of the circuit board 112. In this case, a through-hole 113 having an area corresponding to the wireless power transmission antenna 116 and the MST antenna 115 may be provided in the central portion of the circuit board 112. Accordingly, the wireless power transmission antenna 116 and the MST antenna 115 of which radiators are formed of the flat coils may be disposed in the through-hole 113, and may be electrically connected to the terminals 117 of the circuit board 112 through the lead portions and the connection terminals. The NFC antenna 114 disposed outside the MST antenna 115 may be formed of a pattern on a surface of the circuit board 112 so as to surround the MST antenna 115 of which radiator is disposed in the through-hole 113, and the connection terminals 114a and 114b provided at both ends of the NFC antenna 114 may be connected to the terminals 117 provided on a side of the circuit board 112 through the via-hole.

In an exemplary embodiment, as shown in FIG. 3A, the combo antenna unit 110' may include a wireless power transmission antenna 116, an MST antenna and an NFC antenna 114, of which radiators are formed of flat coils. In this case, the MST antenna 115 and the NFC antenna 114 may be sequentially disposed outside the wireless power transmission antenna 116 so as to surround the wireless power transmission antenna 116, and the plurality of antennas 114, 115 and 116 may be directly fixed to a surface of the shielding unit 120 through an adhesive layer. A circuit board 112 having a very small area and including terminals 117 may be disposed on a side of the shielding unit 120 for electrical connection with an external device. Accordingly, the plurality of antennas 114, 115 and 116 may be electrically connected to the terminal 117 through the lead portions and the connection terminals, respectively.

Accordingly, when the plurality of antennas 114, 115, and 116 are formed of a flat coil, the production cost can be reduced by using the circuit board 112 having a minimum size for electrical connection with an external device. In addition, it is possible to increase the thickness of each of the radiators as much as the thickness of the circuit board 112, and thus the radiator resistance can be reduced according to increase of a cross-sectional area of the radiator. In the result, the efficiency of the antenna can be increased and heat generation can be decreased. Here, the circuit board 112 may be a substrate having at least one antenna pattern and circuit parts formed on its upper surface, and it may be manufactured from a material having the properties of heat resistance, pressure resistance, and flexibility. In consideration of the physical properties of such a material, a PI film or a PET film, which is a thermosetting polymer film, may be employed as the circuit boards 112 and 212.

Though not shown, when all of the antennas 114, 115 and 116 are form of a flat coil, the connection terminals 114a, 114b, 115a, 115b, 116a and 116b may be electrically connected to external devices without through the circuit board. In this case, since the circuit board is not necessary, the circuit board can be omitted so that the production cost can be further reduced.

As shown in FIGS. 5 to 7B, in the combo antenna units 110, 110', 110" according to the present invention, a plurality of antennas 114, 115, and 116 may be arranged on the same plane including a first region S1, which is disposed on a side of a virtual straight line as a boundary, and a second region S2, which is disposed on an opposite side to the first region S1.

In this case, the antennas 114, 115, and 116 included in the combo antenna units 110, 110' and 110" may be formed by combination of a flat coil and a pattern printed on a circuit board. The antenna formed of a flat coil may be disposed in the first region S1, and the antenna formed of a pattern printed on the circuit board may be disposed in the second region S2. Here, the first region S1 may be the left side of the straight line or the left side portion of the shielding unit 120, and the second region S2 may be the right side of the straight line or the right side portion of the shielding unit 120.

In addition, in different frequency bands, for example, the wireless power transmission antenna 116 operating at 100 to 300 kHz and the NFC antenna 114 operating at 13.56 MHz can be disposed on opposite sides with respect to the straight line as a boundary.

Figure 5:
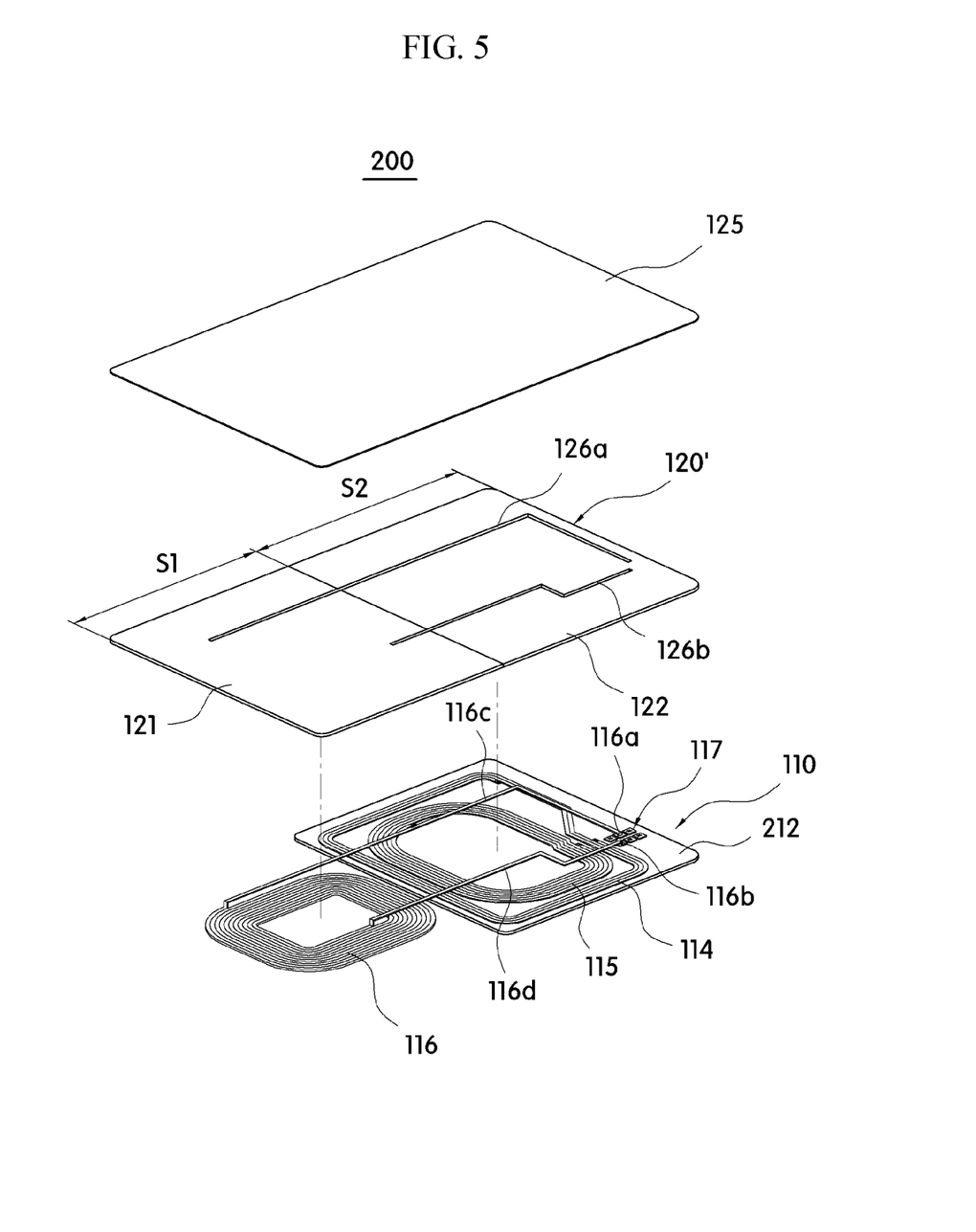
FIG. 5 is a block diagram of a wireless power receiving module according to another embodiment of the present invention.
Figure 6:
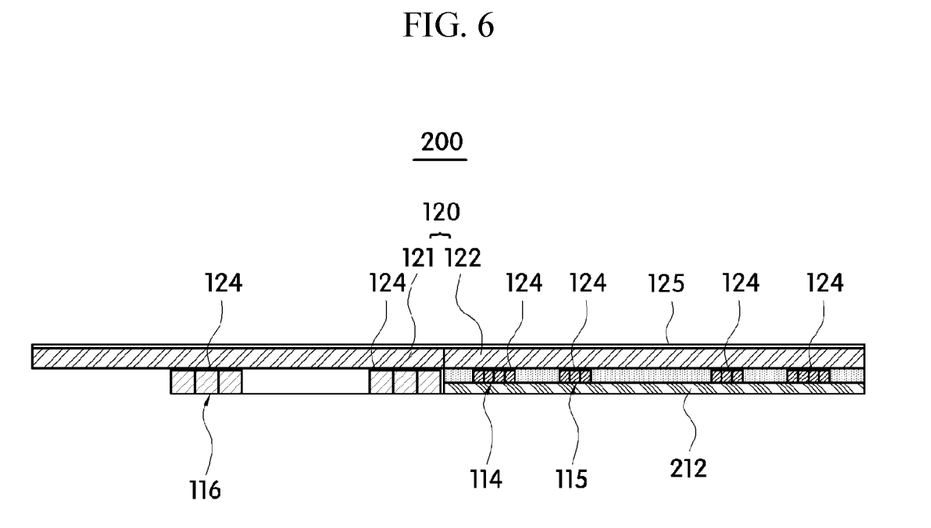
FIG. 6 is a cross-sectional view of FIG. 5.

In an exemplary embodiment of the combo antenna unit 110 including the plurality of antennas 114, 115, and 116 as shown in FIGS. 5 and 6, the radiator of the wireless power transmission antenna 116 may be formed of a flat coil having a circular shape, an elliptical shape, a spiral shape, or a polygonal shape such as a quadrangular shape. The flat coil may be wound in a clockwise direction or in a counterclockwise direction. The radiator of the wireless power transmission antenna 116 may be disposed in the first region S1, and directly fixed to a surface of the shielding unit 120'. Radiators of the MST antenna 115 and the NFC antenna 114 may be formed of a pattern printed on a surface of the circuit board 212, and may be disposed in the second region S2 together with the circuit board 212.

The wireless power transmission antenna 116 may be connected to the terminals 117 on the circuit board 212 through the lead portions 116c and 116d and the connection terminals 116a and 116b. The MST antenna 115 and the NFC antenna 114 can be electrically connected to the terminals 117 via the via-hole, respectively.

Accordingly, it is possible to use the circuit board 212 having a small area corresponding to the second region S2 of the shielding unit 120' only, so that the size of the circuit board 212 can be minimized. Thus, the cross-sectional area of the radiator constituting the wireless power transmission antenna 116 is increased so that the resistance is reduced. Thus, the high power can be realized and the charging efficiency can be increased. In addition, as the antennas operating in different frequency bands are disposed in different regions, the overall thickness of the shielding unit 120' can be reduced, and the shielding unit 120' can be appropriately provided so as to effectively shield the magnetic field according to the frequency band.

Figure 7A:
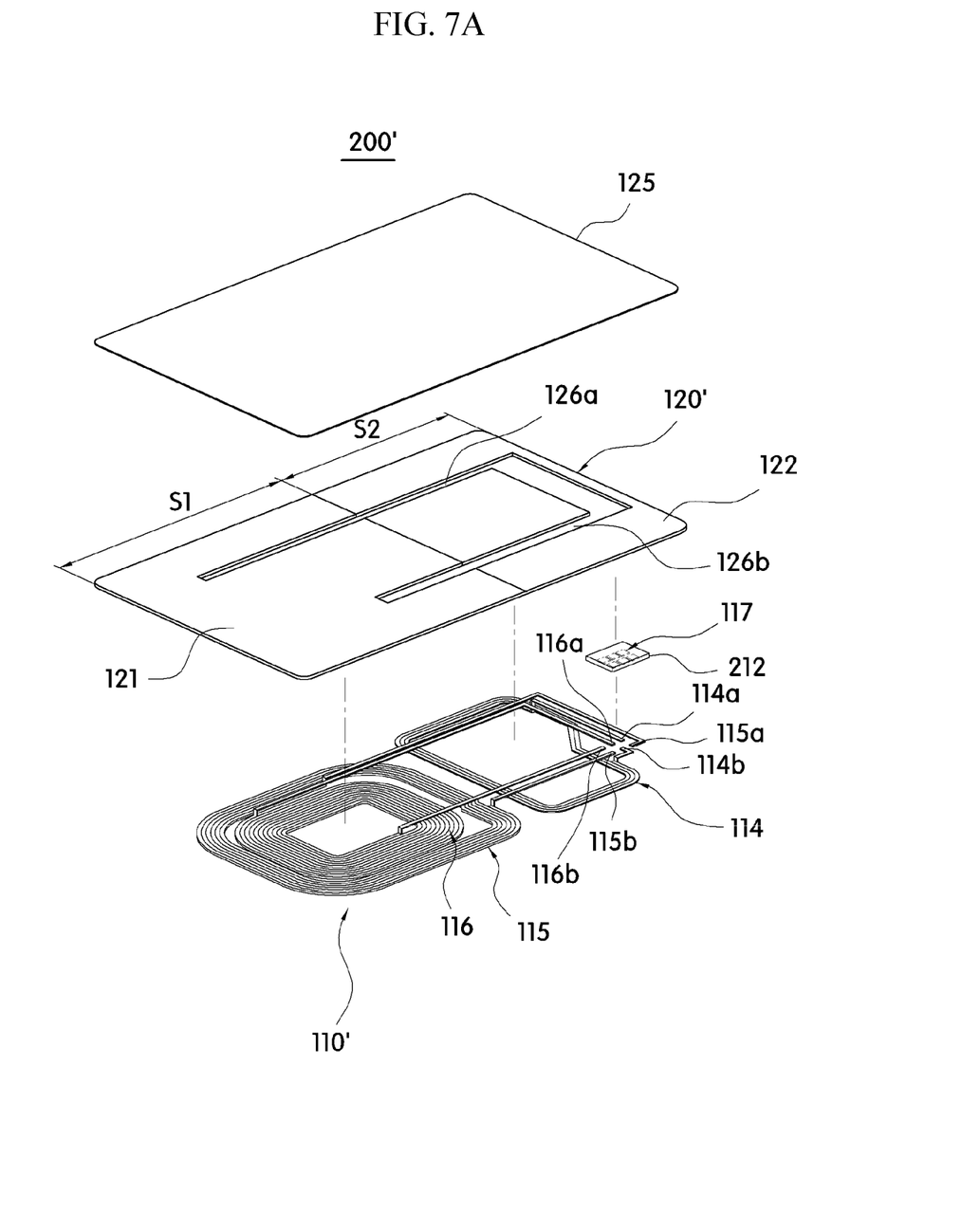
Figure 7B:
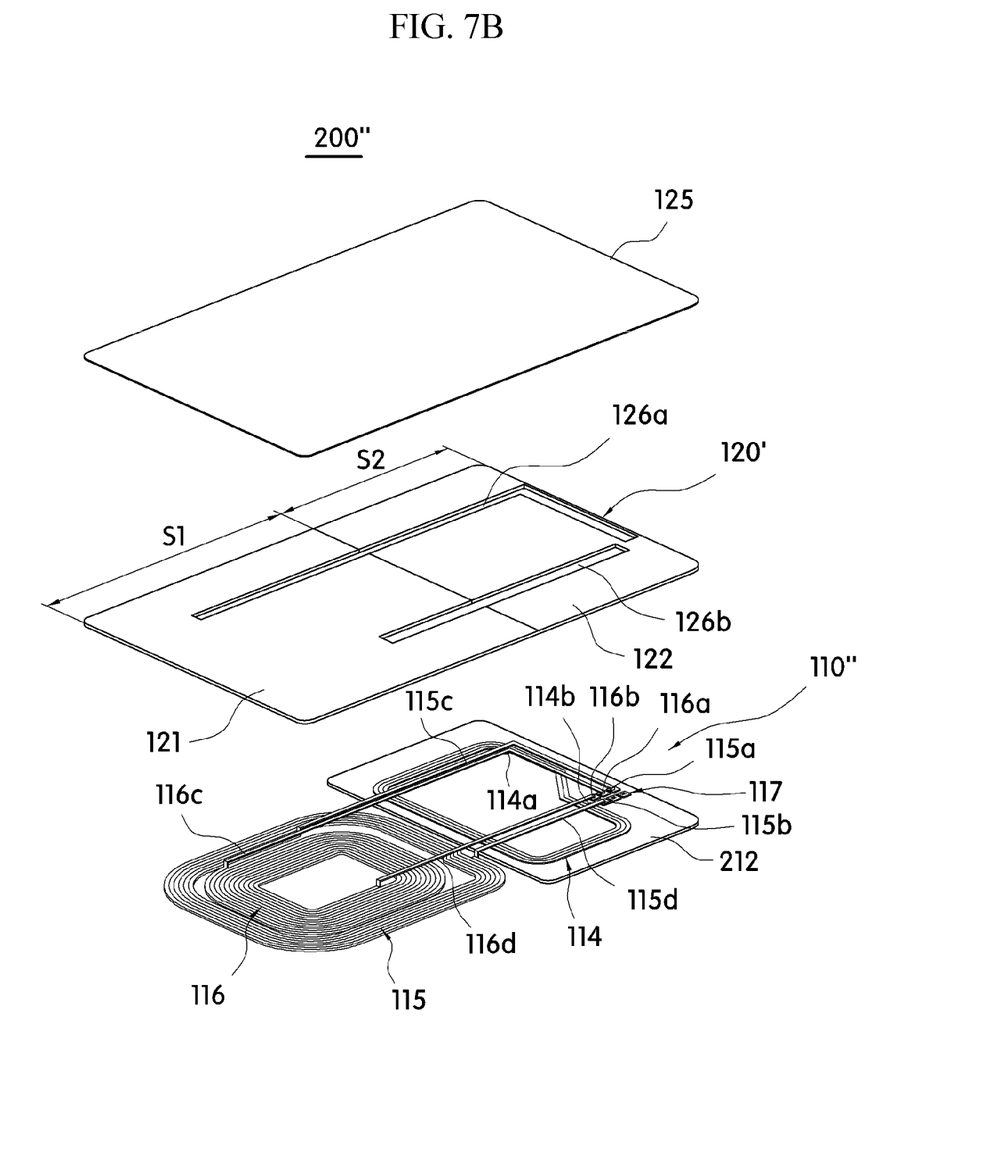

In an exemplary embodiment, the combo antenna 110" may include the plurality antenna 114, 115 and 116 as shown in FIG. 7B. Each of the radiators of the wireless power transmission antenna 116 and the MST antenna 115 may be formed of a flat coil having a circular shape, an elliptical shape, a spiral shape, or a polygonal shape such as a quadrangular shape, in which the flat coil may be wound in a clockwise direction or in a counterclockwise direction. The wireless power transmission antenna 116 and the MST antenna 115 may be disposed in the first region S1 with being directly fixed to a surface of the shielding unit 120'.

The radiator of the NFC antenna 114 may be formed of a pattern printed on a surface of a circuit board 212, and disposed in the second region S2 together with the circuit board 212. At this time, the wireless power transmission antenna 116 and the MST antenna 115 may be electrically connected to the terminals 117 of the circuit board 212 through the lead portions 115c, 115d, 116c, and 116d and the connection terminals 115a, 115b, 116a and 116b, whereas the NFC antenna 114 may be electrically connected to the terminals 117 via the via-hole.

In an exemplary embodiment of a wireless power receiving module 200' shown in FIG. 7A, a wireless power transmission antenna 116, an MST antenna 115, and an NFC antenna 114 of the combo antenna 110" may be all formed a flat coil. In this case, the wireless power transmission antenna 116 may be disposed in a first region S1, and the NFC antenna 114 may be disposed in a second region S2. At this time, the MST antenna 115 may be disposed in the first region S1 so as to surround the wireless power transmission antenna 116, or may be disposed in the second region S2 so as to surround the NFC antenna 114.

In this case, the plurality of antennas 114, 115 and 116 may be directly fixed to a surface of the shielding unit 120' through an adhesive layer. Here, a circuit board 212 having a very small area and including a terminal 117 may be disposed on a side of the shielding unit 120' for electrical connection with an external device. The plurality of antennas 114, 115 and 116 may be respectively connected to the terminals 117 through the lead portions 114c, 114d, 115c, 115d, 116c and 116d and the connection terminals 114a, 114b, 115a, 115b, 116a and 116b.

Accordingly, when the plurality of antennas 114, 115, and 116 are provided in the form of a flat coil, the production cost can be reduced by using only the circuit board 112 having a minimum size for electrical connection with an external device. In addition, as the thickness of the radiator can be increased as much as the thickness of the circuit board 112, the cross-sectional area can be increased. Thus, the efficiency of the antenna can be enhanced and, heat generation can be lowered by reducing the resistance. In addition, as the antennas operating in different frequency bands are disposed in different regions, the overall thickness of the shielding unit 120' can be reduced, and the shielding unit 120' can be appropriately provided so as to effectively shield the magnetic field according to the frequency band.

In an exemplary embodiment, the plurality of antennas 114, 115 and 116 may be all provided in the form of a flat coil, though not shown, and the connection terminals 114a, 114b, 115a, 115b, 116a and 116b may be electrically connected to external devices without the circuit board. In this case, since the circuit board is not necessary, the production cost can be further reduced due to omission of the circuit board.

In an exemplary embodiment, the shielding units 120 and 120' may be formed of a plate-shaped member having a predetermined area, and shield the magnetic field generated from the combo antenna units 110, 110', and 110" to condense the magnetic field in a desired direction.

To this end, the shielding units 120 and 120' may be provided so as to cover a surface of the combo antenna units 110, 110', and 110", and include a first sheet 121 and a second sheet 122 having different characteristics to enhance the performance of the antennas operating in different frequency bands.

Here, the first sheet 121 may be disposed in a region corresponding to the wireless power transmission antenna 116 to enhance the performance of the wireless power transmission antenna 116 operating at 100 to 300 kHz, which is a low frequency band. The second sheet 122 may be disposed in a region corresponding to the NFC antenna 114 to enhance the performance of the NFC antenna 114 operating at 13.56 MHz, which is a high frequency band.

In other words, the first sheet 121 and the second sheet 122 may have different permeabilities in a predetermined frequency band, or may have different saturating magnetic fields. When the first sheet 121 and the second sheet 122 have the same magnetic permeability, the permeability loss rate may be set to have different values. Here, the first sheet 121 and the second 122 sheet may have a permeability of 100 to 1,200.

More specifically, the first sheet 121 may have a relatively higher permeability in a frequency band of 100 to 300 kHz, which is a low frequency band, than that of the second sheet, and may have a relatively higher saturating magnetic field in a frequency band of 100 to 300 kHz, than that of the second sheet. When the first sheet 121 and the second sheet 122 have the same permeability in a frequency band of 100 to 300 kHz, the permeability loss rate of the first sheet 121 may have a relatively lower value than that of the second sheet 122.

For example, each of ribbon sheet 123a, 123b and 123c including at least one of an amorphous alloy and a nanocrystalline alloy having a permeability in the range of 600 to 700 in a frequency band of 100 to 300 kHz may be used for the first sheet 121. The ferrite sheet having a permeability of 600 or less in a frequency band of 100 to 300 kHz may be used for the second sheet 122.

Accordingly, since the first sheet 121 has a relatively higher magnetic permeability than that of the second sheet 122 in the low frequency band of 100 to 300 kHz, a time-varying magnetic field generated by the power transmission in the frequency band of 100 to 300 kHz from a power transmission device during wireless charging is induced to the first sheet 121 having a relatively high permeability. Thus, the wireless power transmission antenna 116 disposed on the first sheet 121 can receive the wireless power signal with high efficiency.

Meanwhile, the first sheet 121 is required to shield a time-invariant magnetic field by a permanent magnet when a permanent magnet is provided in the transmitting device. However, since the time-invariant magnetic field affects the shielding sheet more than the time-varying magnetic field does on the shielding units 120 and 120', the shielding sheet may be magnetic-saturated. Thus, the performance of the shielding sheet is reduced, or the power transmission efficiency is drastically lowered.

Therefore, in case that the permanent magnet is employed in the transmitting device of the wireless charger, it is necessary to prevent magnetic saturation by the permanent magnet. For this reason, as the first sheet 121 is provided so as to have a saturation magnetic flux density value relatively higher than that of the ferrite sheet in a frequency band of 100 to 300 kHz, the first sheet 121 located on the upper side of the wireless power transmission antenna 116 can prevent magnetization by the permanent magnet in a frequency band of 100 to 300 kHz in which wireless charging is performed. Thus, wireless charging can be performed smoothly.

In addition, when the permeability loss rate of the first sheet 121 is lower than that of the second sheet 122 even if the first sheet 121 and the second sheet 122 have the same permeability in the frequency band of 100 to 300 kHz, as a result the permeability loss according to the permeability loss rate is reduced when the wireless charging is performed. Accordingly, the time-varying magnetic field generated by the power transmission in the frequency band of 100 to 300 kHz from the transmission device is induced to the first sheet 121 having a relatively high permeability. Thus, the wireless power transmission antenna 116 disposed on the first sheet 121 can receive the wireless power signal with high efficiency.

Meanwhile, the second sheet 122 may be provided to have a relatively higher magnetic permeability at a frequency of 13.56 MHz, which is a high frequency, than that of the first sheet. When the first sheet 121 and the second sheet 122 have the same permeability, the permeability loss rate of the second sheet 122 may be set to be relatively smaller than the permeability loss rate of the first sheet 121.

For example, each of ribbon sheet 123a, 123b and 123c including at least one of an amorphous alloy and a nanocrystalline alloy may be used for the first sheet 121, and th ferrite sheet having a permeability of ranged 100 to 250 may be used for the second sheet 122. Here, the first sheet 121 may be provided to have a permeability lower than that of the second sheet 122 at 13.56 MHz.

Accordingly, the second sheet 122 has a relatively higher magnetic permeability than that of the first sheet 121 in the frequency of 13.56 MHz. Thus, when NFC is performed, a time-varying magnetic field generated by the high frequency of 13.56 MHz generated from an antenna equipped in an RF reader device is induced to the second sheet 122 having a relatively high permeability, so that the NFC antenna 114 disposed on the second sheet 122 can receive the high frequency signal with high efficiency.

In addition, when the permeability loss rate of the second sheet 122 is lower than that of the first sheet 122 even if the first sheet 121 and the second sheet 122 have the same permeability in a frequency band of 13.56 kHz, as a result the permeability loss according to the permeability loss rate is reduced when the NFC is performed. Accordingly, the time-varying magnetic field generated by the high frequency of 13.56 MHz generated from an antenna equipped in an RF reader apparatus is induced to the second sheet 122 having a relatively high permeability, so that the NFC antenna 114 disposed on the second sheet 122 can receive the high frequency signal with high efficiency.

Here, the ribbon sheet including at least one of an amorphous alloy and a nanocrystalline alloy may be used for the first sheet 121, and the ferrite sheet may be used for the second sheet 122. However, the present invention is not limited thereto. The material of the first sheet 121 and the second sheet 122 may be variously changed as long as the permeability, the saturation magnetic field, and the loss value included in the permeability satisfy the conditions relative to each other in the corresponding frequency band.

In an exemplary embodiment, the first sheet 121 and the second sheet 122 may be made of the same material having different magnetic permeabilities at the frequency of 100 to 300 kHz and/or at the frequency of 13.56 MHz. The ferrite sheet may be used for the first sheet 121, and a thin-film ribbon sheet including at least one of an amorphous alloy and a nanocrystalline alloy may be used for the second sheet 122. Even if they are made of the same material, they can be manufactured to have different characteristics (permeability, saturation magnetic field, permeability loss rate, etc.) through various conditions such as the heat treatment temperature, the number of layers, etc.

A polymer sheet, a ferrite sheet, or the like as well as a ribbon sheet including at least one of an amorphous alloy and a nanocrystalline alloy may be used for the first sheet 121 and the second sheet 122. Here, the amorphous alloy and the nanocrystalline alloy may be Fe-based or Co-based magnetic alloys, and the amorphous alloy or the nanocrystalline alloy may include a three-element alloy or a five-element alloy. For example, the three-element alloy may include Fe, Si, and B, and the five-element alloy may include Fe, Si, B, Cu, and Nb. The ferrite sheet may be a sintered ferrite sheet, and may include at least one of Mn—Zn ferrite and Ni—Zn ferrite. Preferably, the ferrite sheet may be made of Ni—Zn sintered ferrite.

Figure 4:
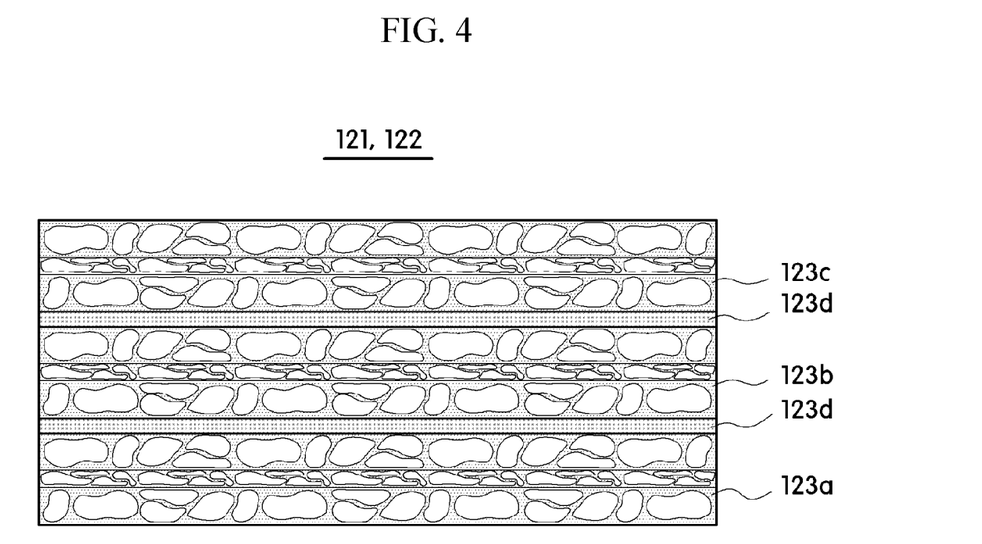
FIG. 4 is a detailed cross-sectional view showing a shielding unit, which includes a multi-layer ribbon sheet, applied to a wireless power receiving module according to an embodiment of the present invention.

As shown in FIG. 4, in an exemplary embodiment the first sheet 121 and the second sheet 122 may have a multilayer structure, in which a plurality of ribbon sheets 123a, 123b and 123c including at least one of an amorphous alloy and a nanocrystalline alloy are stacked. In addition, the first sheet 121 and the second sheet 122 are not limited to the above-mentioned kinds, and other materials can be used as long as they have a magnetic property and a permeability in the range of 100 to 1,200.

In an exemplary embodiment, at least one of the first sheet 121 and the second sheet 122 may be divided into a plurality of fine pieces so as to suppress the generation of eddy currents. The plurality of fine pieces may be separated from each other, or may be totally or partially insulated from each other. In addition, the plurality of fine pieces may be provided in a size of 1 μm to 3 mm, and each piece may be irregularly randomized.

When a plurality of sheets 123a, 123b and 123c formed by separated fine pieces are stacked to form multiple layers in at least one of the first sheet 121 and the second sheet 122, an adhesive layer 123d made of a non-conductive material may be disposed between adjacent sheets to permeate between the pair of sheets stacked on each other so that the adhesive layer 123d can insulate the plurality of fine pieces constituting each sheet from each other.

Here, the adhesive layer may be provided as an adhesive agent, or may be provided as a substrate in the form of a film, in which an adhesive agent is applied on a surface or on both surfaces.

Meanwhile, as shown FIGS. 1 to 3, the shielding unit 120 may be formed by stacking the second sheet 122 on a surface of the first sheet 121. The shielding unit 120 may include receiving portions 126a and 126b for receiving lead portions of an antenna, which is provided in the shape of a flat coil, among a plurality of antennas. The receiving portion may be formed to pass through only the second sheet 122, to which the combo antenna units 110, 110' and 110" are attached, in the case that the first sheet 121 and the second sheet 122 are stacked. Accordingly, the receiving portion is provided as a receiving recess in the form of a dent with predetermined depth at a surface of the shielding unit 120 so that the lead portions of the antenna, which are provided in the form of a flat coil, among the antennas may be inserted into the receiving portion.

The first sheet 121 may have at least an area which can cover the wireless power transmission antenna 116 disposed at the center portion so that the area of the first sheet 121 can correspond to the area of the wireless power transmission antenna 116.

The first sheet 121 may have the same area as the second sheet 122, or may have an area corresponding to the wireless power transmission antenna 116. In addition, although not shown, the first sheet 121 may be provided so as to have an area corresponding to the wireless power transmission antenna 116, and may be inserted into the second sheet 122 side. When the first sheet 121 and the second sheet 122 are stacked in a vertical direction, the receiving portions 126a and 126b may be formed so as to pass through both of the first sheet 121 and the second sheet 122.

As shown FIGS. 5 to 7B, in the shielding unit 120', when the wireless power transmission antenna 116 and the NFC antenna 114 are separately disposed in different areas, the first sheet 122 and the second sheet 122 may be disposed in the first region S1 and in the second region S2, respectively, so as to be separated by the straight boundary line and thus to correspond to positions of the wireless power transmission antenna 116 and the NFC antenna 114, respectively. That is, the first sheet 121 may be disposed in the first region S1, in which the wireless power transmission antenna 116 is disposed, and the second sheet 122 may be disposed in the second region S2, in which the NFC antenna 114 is disposed.

Here, the first sheet 121 may be formed to have an area which can cover at least the wireless power transmission antenna 116, and the second sheet 122 may be formed to have an area which can cover at least the NFC antenna 114. In addition, the first sheet 121 may include, or not include an area immediately above the MST antenna 115 when the MST antenna 115 is disposed outside the wireless power transmission antenna 116.

In the shielding units 120 and 120' according to an exemplary embodiment, the first sheet 121 is disposed in a region corresponding to the wireless power transmission antenna 116, and the second sheet 122 is disposed in a region corresponding to the NFC antenna 114. Thus, the performance of the wireless power transmission antenna 116 and the NFC antenna 114 can be enhanced. In addition, as shown FIGS. 5 and 7, the first sheet 121 and the second sheet 122 are arranged so that the their ends may abut against each other on the same plane, and the first sheet 121 and the second sheet 122 are arranged in parallel with each other. Therefore, the overall thickness of the shielding unit 120' can be reduced while enhancing the performance of the corresponding antennas.

Accordingly, since the first sheet 121 and the second sheet 122 are arranged on the same plane, the overall thickness of the shielding unit 120' is equal to the thickness of the sheet relatively thicker one among the first sheet 121 and the second sheet 122. Therefore, even if the overall thickness of the wireless power receiving module 200 or 200' is reduced to be, for example, 0.6 mm or less, or even 0.3 mm or less, the required characteristics in the wireless charging method can be satisfied. However, it should be understood that the thickness of the wireless power receiving module 200 is not limited to the thickness described above, and the thickness may be other values, for example, a very thin thickness.

In an exemplary embodiment, receiving portions 126a and 126b for receiving the lead portions of the antenna, which is provided in the form of a flat coil, among the plurality of antennas may be provided on the first sheet 121 and the second sheet 122, respectively, which are disposed in parallel each other. The receiving portions may be formed through the first sheet 121 and the second sheet 122 so as to correspond to the lead portions of the antenna when the first sheet 121 and the second sheet 122 are disposed in parallel. Accordingly, the receiving portions 126a and 126b are provided in the form of an incision portion formed through the shielding unit 120' so that the lead portions of the antenna, which are provided in the form of a flat coil, among the plurality of antennas may be inserted in the receiving portions. In addition, although not shown, the receiving portions may be provided in the form of a receiving recess with a predetermined depth on a surface of the first sheet 121 and the second sheet 122.

Meanwhile, the shielding units 120 and 120' may be provided with a separate protective film 125 to cover the first sheet 121 and the second sheet 122 at the same time on at least one of the upper and lower surfaces thereof. The protective film 125 may be attached on a same-side surface of the first sheet 121 and the second sheet 122 via an adhesive layer to integrate the first sheet 121 and the second sheet 122 separated from each other. The adhesive layer may be formed of a non-conductive material. When the first sheet 121 and the second sheet 122 are divided into several fine pieces, the adhesive layer may be absorbed between the fine pieces to insulate the fine pieces. In addition, the adhesive layer may be provided as an adhesive agent, or may be provided in the form of a protective film coated with an adhesive agent on one or both surfaces of a film-shaped substrate.

It should be noted that the combo antenna units 110, 110' and 110" and the wireless power receiving modules 100, 200 and 200' including the same according to the exemplary embodiments of the present invention can be applied to the wireless charging method of the Qi standard or the Power Matters Alliance (PMA) standard. In addition, the antenna for wireless power transmission may be an Alliance for Wireless Power (A4WP) standard-type antenna using magnetic resonance, or may be an antenna operating in a magnetic induction manner. The antenna for wireless power transmission may operate in a magnetic induction manner and another A4WP standard-type antenna using the magnetic resonance may be included to a separate other antenna. Each of the wireless power receiving modules 100, 200, and 200' may be applied to an electronic device such as a portable terminal in a form that it attached to a back cover of the electronic device.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A combo antenna unit comprising:
a wireless power transmission antenna and at least one additional antenna using a different frequency band from the wireless power transmission antenna,
wherein the wireless power transmission antenna includes a radiator formed of a loop-shape-wound flat coil,
wherein the additional antenna includes one or both of a magnetic secure transmission (MST) antenna and a near field communication (NFC) antenna,
wherein the MST antenna or the NFC antenna includes a radiator formed of a loop-shape-wound flat coil, and a surface of the radiator is attached to a shielding unit,
wherein the additional antenna includes an MST antenna and an NFC antenna, wherein the MST antenna includes a radiator formed of a loop-shape-wound flat coil, and wherein the NFC antenna includes a radiator formed of a printed pattern on a circuit board which is attached to a surface of a shielding unit.

2. The combo antenna unit of claim 1, wherein the additional antenna includes an MST antenna and an NFC antenna, and each of the MST antenna and the NFC antenna includes a radiator formed of a printed pattern on a circuit board which is attached to a surface of the shielding unit.

3. The combo antenna unit of claim 2, wherein the circuit board includes a through-hole with a predetermined area formed in a region corresponding to the flat coil, and the flat coil is disposed in the through-hole and directly attached to a surface of the shielding unit.

4. The combo antenna unit of claim 2, wherein the flat coil and the circuit board are disposed in parallel on the same plane.

5. A wireless power receiving module comprising:
a combo antenna unit including a wireless power transmission antenna and at least one additional antenna using a different frequency band from the wireless power transmission antenna, and
a shielding unit disposed on a surface of the combo antenna unit and shielding a magnetic field to condense the magnetic field in a desired direction,
wherein the wireless power transmission antenna includes a radiator formed of a loop-shape-wound flat coil,
wherein the additional antenna includes one or both of a magnetic secure transmission (MST) antenna and a near field communication (NFC) antenna,
wherein the MST antenna or the NFC antenna includes a radiator formed of a loop-shape-wound flat coil, and a surface of the radiator is attached to a shielding unit,
wherein the additional antenna includes the MST antenna and the NFC antenna, and each of the MST antenna and the NFC antenna includes a radiator formed of a printed pattern on a circuit board which is attached to a surface of the shielding unit.

6. The wireless power receiving module of claim 5, wherein the additional antenna includes the MST antenna and the NFC antenna, wherein the MST antenna incudes a radiator formed of a loop-shape-wound flat coil, and wherein the NFC antenna includes a radiator formed of a printed pattern on a circuit board, which is attached to a surface of the shielding unit.

7. The wireless power receiving module of claim 5, wherein the circuit board includes a through-hole with a predetermined area formed in a region corresponding to the flat coil, and the flat coil is disposed in the through-hole and directly attached to a surface of the shielding unit.

8. The wireless power receiving module of claim 5, wherein the shielding unit includes a first region and a second region divided by a virtual straight line as boundary, wherein the flat coil is attached to the first region, and the circuit board is attached to the second region.

9. The wireless power receiving module of claim 5, wherein the flat coil includes a pair of connection terminals at both ends for electrical connection, and the shielding unit includes a receiving portion, in which a lead portion including the connection terminals is disposed, on a surface of the shielding unit.

10. The wireless power receiving module of claim 9, wherein the receiving portion is a receiving recess which is dented by a predetermined depth from a surface of the shielding unit, and the lead portion is inserted in the receiving recess.

11. The wireless power receiving module of claim 9, wherein the receiving portion is an incision portion which is incision-formed on an inner side of the shielding unit, and the lead portion is inserted in the incision portion.

12. The wireless power receiving module of claim 8, wherein the shielding unit includes a first sheet for improving performance of the wireless power transmission antenna and a second sheet for improving performance of the NFC antenna, wherein the first sheet is disposed in the first region and the second sheet is disposed in the second region.

13. The wireless power receiving module of claim 12, wherein the first sheet and the second sheet are arranged such that ends of the first sheet and the second sheet abut against each other on the same plane.

14. The wireless power receiving module of claim 12, wherein the first sheet is a ribbon sheet including at least one of an amorphous alloy and a nanocrystalline alloy, and the second sheet is a ferrite sheet.

* * * * *